United States Patent
DiVerdi et al.

(10) Patent No.: US 10,109,083 B2
(45) Date of Patent: Oct. 23, 2018

(54) LOCAL OPTIMIZATION FOR CURVY BRUSH STROKE SYNTHESIS

(71) Applicant: ADOBE SYSTEMS INCORPORATED, San Jose, CA (US)

(72) Inventors: Stephen Joseph DiVerdi, Oakland, CA (US); Jingwan Lu, Santa Clara, CA (US)

(73) Assignee: Adobe Systems Incorporated, San Jose, CA (US)

( * ) Notice: Subject to any disclaimer, the term of this patent is extended or adjusted under 35 U.S.C. 154(b) by 0 days.

(21) Appl. No.: 15/235,718

(22) Filed: Aug. 12, 2016

(65) Prior Publication Data

US 2018/0047189 A1    Feb. 15, 2018

(51) Int. Cl.
  *G06T 11/20*   (2006.01)
  *G06F 3/0484*  (2013.01)
  *G06F 3/0488*  (2013.01)

(52) U.S. Cl.
  CPC ........ *G06T 11/203* (2013.01); *G06F 3/04845* (2013.01); *G06F 3/04883* (2013.01)

(58) Field of Classification Search
  None
  See application file for complete search history.

(56) References Cited

U.S. PATENT DOCUMENTS 5,594,855 A * 1/1997 Von Ehr, II ........... G06T 11/203
                                                     345/442

OTHER PUBLICATIONS

Asente, Paul J. "Folding avoidance in skeletal strokes." Proceedings of the Seventh Sketch-Based Interfaces and Modeling Symposium. Eurographics Association, 2010.*

Northrup, J. D., and Lee Markosian. "Artistic silhouettes: A hybrid approach." Proceedings of the 1st international symposium on Non-photorealistic animation and rendering. ACM, 2000.*

Su, Sara L., et al. "Simulating artistic brushstrokes using interval splines." Proceedings of the 5th IASTED International Conference on Computer Graphics and Imaging. 2002.*

Jenkins, D. L., and R. R. Martin. "Applying constraints to enforce users' intentions in free-hand 2-D sketches." Intelligent Systems Engineering 1.1 (1992): 31-49.*

(Continued)

*Primary Examiner* — Ryan M Gray
(74) *Attorney, Agent, or Firm* — Shook, Hardy & Bacon L.L.P.

(57) ABSTRACT

Systems and methods provide for on the fly creation of curvy, digital brush strokes using incremental, local optimization. Samples from a user's input stroke are detected and matched with exemplar brush stroke segments as the user proceeds to provide input. For each set of samples, a temporary segment is generated and displayed for the user, and the temporary segment is later replaced by a permanent segment as subsequent samples sets are matched. Additionally, this optimization allows for updated parameterization in corner regions to provide a more realistic curve in the digital brush stroke. Specifically, intersecting ribs in the corners may be collapsed to prevent the rendering of artifacts. Additionally, and corner structures may be inserted in a break in a corner structure. These corner structures may be extensions of samples around the break and may correct distortion that results from the rib collapsing.

20 Claims, 10 Drawing Sheets

(56) References Cited

OTHER PUBLICATIONS

DiVerdi, Stephen. "A brush stroke synthesis toolbox." Image and video-based artistic stylisation. Springer, London, 2013. 23-44.*
Lu, Jingwan et al., "RealBrush: Painting with Examples of Physical Media", ACM Transactions on Graphics (TOG)—SIGGRAPH 2013 Conference Proceedings, vol. 32, No. 4 (2013), 12 oages.

* cited by examiner

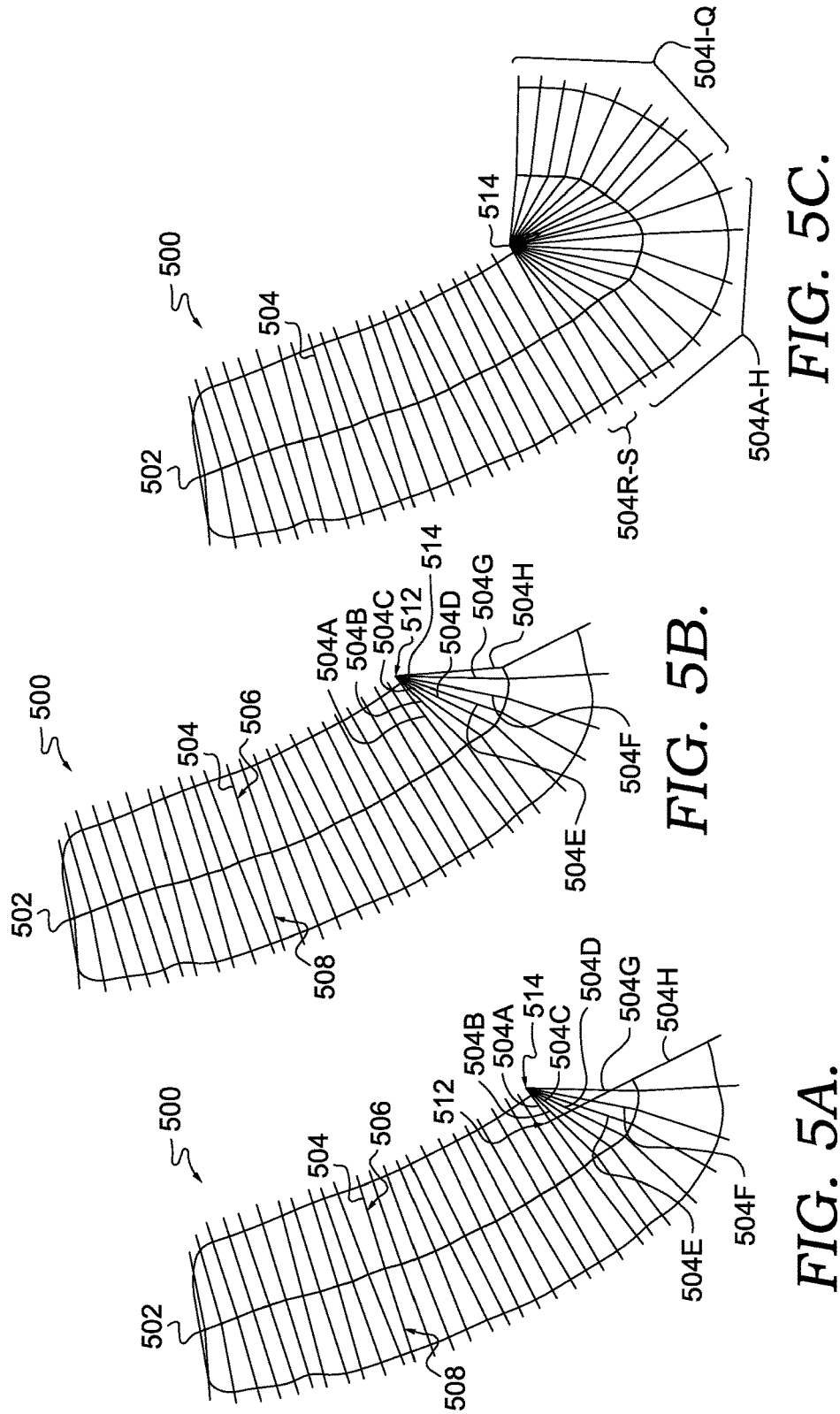

LOCAL OPTIMIZATION FOR CURVY BRUSH STROKE SYNTHESIS

BACKGROUND

Many applications have presented users with the option to paint a digital picture by making digital brush strokes. At its most basic form, rendering a digital brush stroke involves application of a user input stroke, which may be indicated by movement of a pointing device across an electronic canvas, to a particular stroke synthesis technology, such as an algorithm, to obtain an output of a digital brush stroke following the input stroke. Unlike with traditional, physical painting, there exists some lag time between the user's input and the rendering of the digital brush stroke. For the painting experience to be interactive, however, it is desirable to reduce this lag time as much as possible to have the digital brush stroke displayed almost immediately as the input stroke moves across the electronic canvas. A digital brush stroke synthesized in near real time, or "on the fly," provides a user with more control.

This lag time during rendering is particularly prominent with more complex stroke synthesis technologies, such as data-driven approaches that use real brush stroke samples to recreate a natural appearing digital brush stroke. While these complex approaches have the advantage of providing output closely resembling physical painting media, they tend to require more processing to render the digital brush stroke, thereby increasing the lag time for the output to be displayed. Further, data-driven models also experience difficulties in parameterizing corner regions of a curve in a way to prevent artifacts, texture stretching, and shape distortion, all of which limit the natural appearance of a curvy, digital brush stroke.

SUMMARY

Aspects of the present invention relate to, among other things, continuous pattern matching to generate a digital brush stroke by utilizing local, incremental optimization to provide immediate or near immediate visual feedback. The disclosed continuous pattern matching detects samples from a user's input stroke and matches those samples with exemplar brush stroke segments as the user proceeds to provide input. For each set of samples, a temporary segment is generated and displayed for the user, and the temporary segment is later replaced by a permanent segment as subsequent samples sets are matched. In this way, the permanent segment may have a superior appearance because it is based on more samples, but the user does not have to wait to receive visual feedback until a desired brush stroke is fully inputted by the user. Instead, pattern matching techniques are used at an incremental level to synthesize a digital brush stroke "on the fly."

Embodiments of the present invention also relate to generating realistic corner regions of digital brush strokes on the fly. The usual parameterization of a brush stroke for pattern matching can lead to artifacts in or distortion of the corner regions of the digital brush stroke. To avoid artifacts, embodiments collapse intersecting ribs that define the parameters of a brush stroke such that the endpoints of the ribs within a corner region meet at a single intersect point. Additionally, as ribs are collapsed, the rib lengths are compared to threshold values to detect distortion in the corner regions. When distortion is detected, corner structures are inserted, and the resulting brush strokes are generated using the corner structures.

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

BRIEF DESCRIPTION OF THE DRAWINGS

The present invention is described in detail below with reference to the attached drawing figures, wherein:

FIGS. 5A-C depict parameterization of a curved, digital brush stroke in accordance with some implementations of the present disclosure;

DETAILED DESCRIPTION

Figure 1:
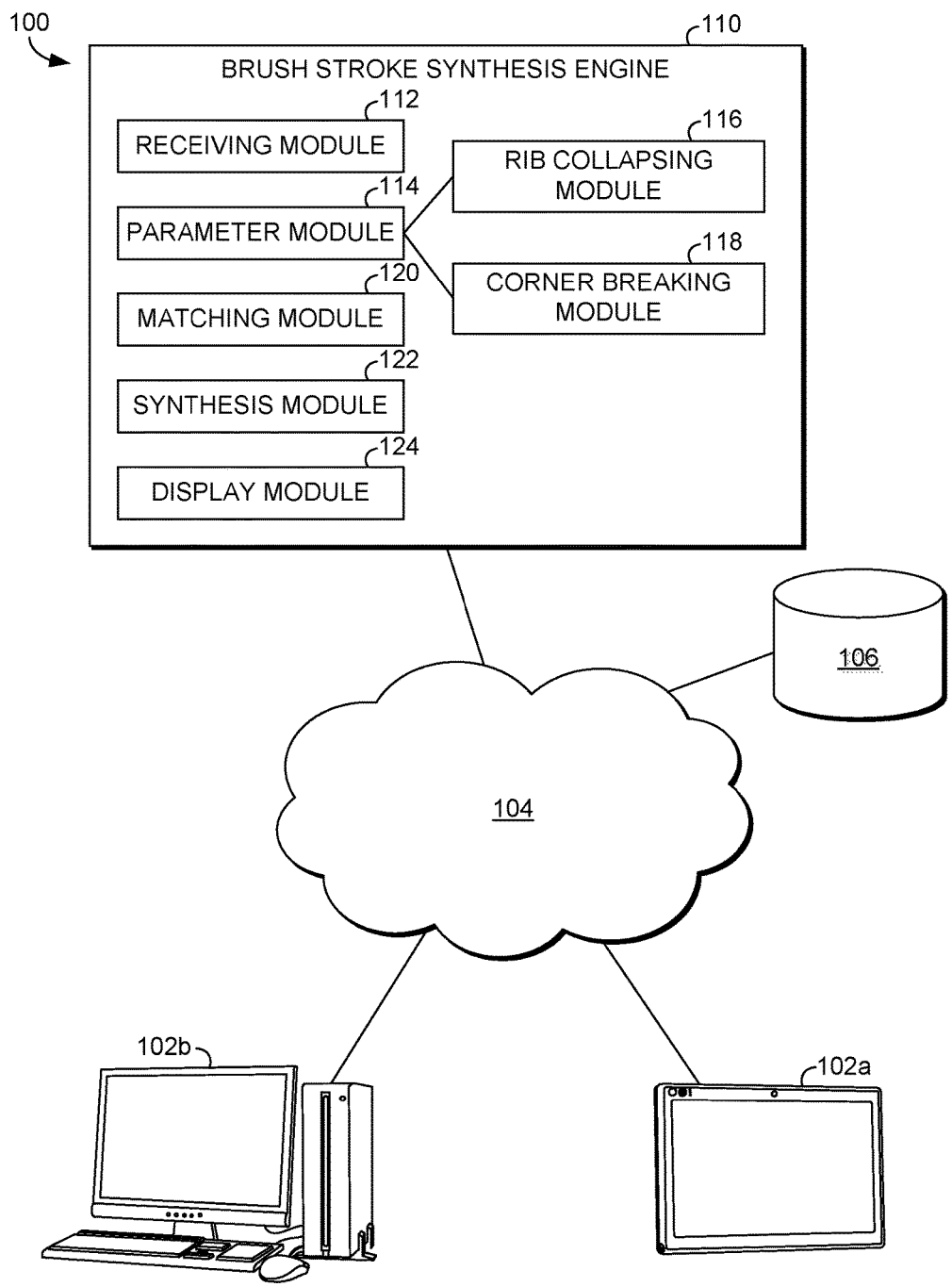
FIG. 1 depicts a block diagram illustrating an example operating environment in accordance with some implementations of the present disclosure.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Some methods for creating digital brush strokes involve matching samples taken from a user's input stroke, such as a line drawn with a stylus, to stored brush strokes. Generally, more samples that are available for matching provides for greater accuracy in matching the samples, producing a more natural appearance for the digital brush stroke. For this reason, global optimization is traditionally used with matching techniques, particularly complex, data-driven techniques. As used herein, "optimization" refers to matching samples to exemplar brush stroke segments and synthesizing a resulting digital brush stroke segment. As used herein, "exemplar brush stroke segments" refer to previously stored brush stroke segments that are used as examples for generating new brush strokes.

While local optimization may synthesize a brush stroke incrementally based on small portions of a desired brush stroke path, global optimization synthesizes digital brush strokes based on all or substantially all of a desired brush stroke path. As such, global optimization requires a user to wait until the user indicates a large amount of the desired brush stroke path and, in some instance, the entire path, before matching and brush stroke synthesis occurs. Waiting for more samples to use for matching and synthesis, however, creates a visual feedback delay that users may find undesirable or even intolerable. This visual delay may be perceived by the presence of empty space between the last rendered digital brush stroke and indications of the user's current input, such as the pointer on a screen or a stylus on a touchscreen.

In addition to causing a visual feedback delay, global optimization provides additional barriers to creating a natural appearance to a curvy, digital brush stroke. As an input path is being received from the user, parameters are applied to the path for purposes of matching and synthesizing a digital brush stroke. Application of parameters in corner or curved region of a curvy path line can yield distorted results when done in the same manner as application of parameters in straight regions. With global optimization, however, the parameters in the corner regions cannot be adjusted, thereby maintaining the artifacts and distortion within the final synthesized brush stroke.

Embodiments of the present invention address the technical challenge of performing continuous pattern matching to create a curvy, digital brush stroke on the fly by creating series of temporary and permanent brush stroke segments from matching sets of received data samples to exemplar brush stroke segments. As such, embodiments of the present disclosure aim to provide immediate or almost immediate visual feedback by performing incremental local optimization with smaller amounts of samples without sacrificing the quality of the brush stroke generated. The disclosed methods for incrementally optimizing brush stroke segments provide a level of expressive control and manual interaction to more closely mimic a physical painting experience.

Specifically, in accordance with embodiments of the disclosure, as data samples indicating an input stroke are continuously received, sets of samples are detected from the data and matched to exemplar brush stroke segments. Based on the matched exemplar brush stroke segments, temporary brush stroke segments are generated and displayed to provide quick feedback to the user. When additional data samples are detected and matched, new temporary segments are generated and displayed while previous temporary segments are replaced with permanent segments. For example, a first set of samples may be matched to a first set of exemplar brush stroke segments, which is used to generate and display a first temporary stroke segment. A second set of samples received immediately after the first set of samples may then be matched, in conjunction with the first set, to second set of exemplar brush stroke segments. From the second set of exemplar brush stroke segments, a first permanent segment is generated to replace the first temporary segment while a second temporary segment is also generated. The second temporary segment is continuous with the first permanent segment and will be subsequently replaced by a permanent segment as more matching occurs. Local optimization through use of the permanent and temporary segments together provide sufficient data to make intelligent matching decisions while allowing for brushing stroke synthesis on the fly.

Use of temporary segments that may be later updated to permanent segments also allows for parameterization adjustments to accommodate corner regions of a curvy brush stroke. As previously mentioned, parameterization of a corner region of an input stroke may be problematic if done in the same manner as in straight regions. Specifically, during parameterization of an input stroke for purposes of matching, ribs may be applied perpendicular or substantially perpendicular to an input path, and when ribs intersect at corner regions, undesired artifacts within the digital brush stroke may be created. To address this problem, some configurations correct intersecting ribs as segments are updated from temporary segments to permanent segments. In particular, any intersecting rib may be collapsed, or adjusted so that the intersecting ribs all meet at a single meeting point, and that meeting point is positioned at the endpoints of the intersecting ribs. Additionally, as ribs are collapsed, the rib lengths are compared to threshold values to detect distortion in the corner regions. When distortion is detected, a brush stroke segment is divided at a breaking sample, which has the maximum turning angle, and any collapsed ribs within the corner region of the segment are restored to their pre-collapsed form. At least one corner structure is generated and inserted within the corner region. For example, a first corner structure may be generated based on the matching of the breaking sample, and a second corner structure may be generated based on the matching of a post-breaking sample. The two corner structures may be inserted at least between the breaking and the post-breaking samples to provide a rounded, natural looking corner without shape or texture distortion.

With reference now to the drawings, FIG. 1 is a block diagram illustrating an exemplary operating environment 100 for generating curved, digital brush strokes with continuous pattern matching in accordance with implementations of the present disclosure. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

The operating environment 100 is an example of a suitable architecture for implementing certain aspects of the present disclosure. Among other components not shown, the operating environment 100 includes a number of user devices, such as 102a and 102b, a network 104, storage 106, and a brush stroke synthesis engine 110. The brush stroke synthesis engine includes a receiving module 112, a parameter module 114, a matching module 120, a synthesis module 122, and a display module 124. The parameter module 114 may further comprise a rib collapsing module 116 and a corner breaking module 118.

It should be understood that the operating environment 100 shown in FIG. 1 is an example of one suitable operating environment. Each of the components shown in FIG. 1 may be implemented via any type of computing device, such as one or more of the computing device 1000, described in connection to FIG. 10, for example. These components may communicate with each other via the network 104, which may be wired, wireless, or both. The network 104 can include multiple networks, or a network of networks, but is shown in simple form so as not to obscure aspects of the present disclosure. By way of example, the network 104 can include one or more wide area networks (WANs), one or more local area networks (LANs), one or more public networks, such as the Internet, and/or one or more private networks. Where the network 104 includes a wireless telecommunications network, components such as a base station, a communications tower, or even access points (as well as other components) may provide wireless connectivity. Networking environments are commonplace in offices, enterprise-wide computer networks, intranets, and the Internet. Accordingly, the network 104 is not described in significant detail.

It should be understood that any number of user devices, servers, and data sources may be employed within the operating environment 100 within the scope of the present disclosure. Each of the above may comprise a single device or multiple devices cooperating in a distributed environment. For instance, the brush stroke synthesis engine 110 may be provided via multiple devices arranged in a distributed environment that collectively provide the functionality described herein. Additionally, other components not shown may also be included within the distributed environment. In some cases, functionality of the brush stroke synthesis engine 110 can be integrated, at least partially, into a user device, such as user devices 102a or 102b. Furthermore, the brush stroke synthesis engine 110 may at least partially be a cloud computing service. The brush stroke synthesis engine 110 may be provided for by an image editing or graphic design software such as Adobe® Photoshop® or Adobe® Illustrator®.

Embodiments of the disclosure described herein may be implemented in a standalone painting simulation application or in a painting simulation module of a digital painting application or another type of graphics application. For example, a digital painting application may present a user interface for receiving input from a user specifying values of one or more criteria to be applied in digital painting operations, may model paint loaded on a virtual brush, may deposit paint onto a digital canvas. The brush stroke synthesis engine 110 operating within the operating environment 100 may interface with such a digital painting application to provide one or more methods for generating brush strokes based on the user input.

The user devices 102a and 102b comprise any type of computing device capable of being operated by a user. In some implementations, the user devices 102a and 102b are the type of computing devices described in relation to FIG. 10 herein. By way of example and not limitation, a user device may be embodied as a personal computer (PC), a laptop computer, a mobile device, a smartphone, a tablet computer, a smart watch, a wearable computer, a personal digital assistant (PDA), an MP3 player, a global positioning system (GPS) or device, a video player, a handheld communications device, a gaming device or system, an entertainment system, a vehicle computer system, an embedded system controller, a remote control, an appliance, a consumer electronic device, a workstation, any combination of these delineated devices, or any other suitable device.

The user devices 102a and 102b may include one or more processors, and one or more computer-readable media. The computer-readable media includes computer-readable instructions executable by the one or more processors. The instructions may be embodied by one or more applications capable of providing the brush stroke synthesis engine 110 to the user. It is contemplated herein that "application" be interpreted broadly. As one example, an application can be installed on an operating system of a user device. As another example, an application can be a service integrated into an operating system of a user device. In various implementations, an application can be on a user device but can at least partially be hosted server-side.

The user devices 102a and 102b, as well as other components of the operating environment 100, may be communicatively coupled to storage 106. Storage 106 generally stores information including data, computer instructions (e.g., software program instructions, routines, or services), logic, profiles, and/or models used in embodiments. For instance, storage 106 may store rules, conditions, associations, classification models, algorithms, or other criteria to perform the disclosed methods of generating a digital brush stroke. Storage may also be used to store, among other things, libraries of exemplar brush stroke segments used in accordance with embodiments of the disclosure, temporary and/or permanent brush stroke segments generated, files created having digital brush strokes, and user preferences. In an embodiment, storage 106 comprises a data store (or computer data memory). Further, although depicted as a single data store component, storage 106 may be embodied as one or more data stores or may be part of a cloud-based platform.

As previously mentioned, the brush stroke synthesis engine 110 includes a receiving module 112, a parameter module 114, a matching module 120, a synthesis module 122, and a display module 124. The receiving module 112 receives data indicating an input stroke. The data is received from one or more input devices, a cursor control device, including a mouse, a touch pad, a button, a stylus on a tablet, a track ball, or another suitable input device. For example, the input stroke may be determined by actions taken from "mouse down" to "mouse up", or from the "click" of a cursor control mechanism to the "release" of that mechanism, in different embodiments. Additionally, the input data received by the receiving module 112 may be touch input received from a touchscreen on user devices 102a and 102b through a stylus, finger, or other instrument.

Data indicating the input stroke determines, among other things, the curvature and location of the digital brush stroke on the digital canvas as desired by the user. The digital brush stroke may also be defined by one or more values of other criteria, indicating the physical appearance and behavior of the brushstroke. For example, in some embodiments, the digital brush stroke generated is defined by color, lightness, transparency, brush shape, brush size, brush texture, canvas texture, and the like. Values for these criteria may be pre-defined or may be set by the user. Data indicating these values are received by the receiving module 112 of the brush stroke synthesis engine 110 or by another component.

Figure 2:
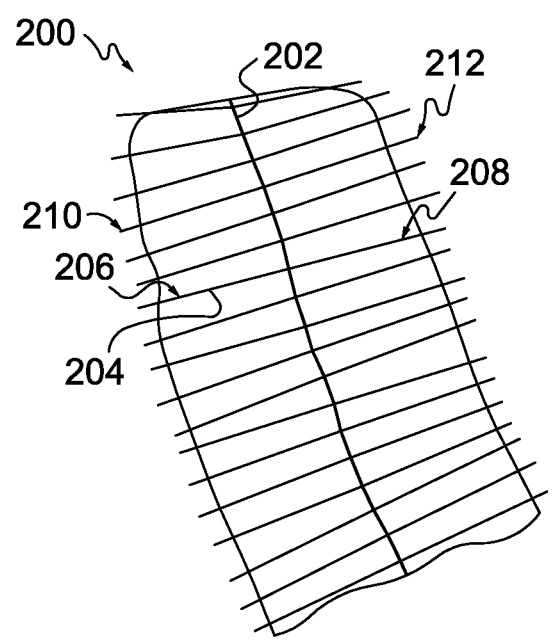
FIG. 2 depicts parameterization of a digital brush stroke in accordance with implementations of the present disclosure.

Based on at least the input stroke and, in some embodiments, values for other criteria, the parameter module 114 of the brush stroke synthesis engine 110 identifies parameters of the user stroke by applying at least an input path line and ribs are applied. Briefly turning to FIG. 2, parameterization of an input stroke 200 is illustrated. An input path line 202 is applied to the input stroke 200 to run parallel with the input stroke 200. The input path line 202 may represent the center of the input stroke. Ribs 204 are spaced along and transect the input path line 202. Each rib 204 includes a first portion 206 extending from a first side of the input path line 202 and a second portion 208 extending from a second side of the input path line 202. The first portion 206 and the second portion 208 of each rib 204 include endpoints 210 and 212, respectively. These endpoints 210 and 212 are distal from the input path line 202.

Initially, the ribs 204 may be perpendicular or substantially perpendicular to the input path line 202 but may be adjusted in accordance with some embodiments of the disclosure. Specifically, as shown in FIG. 1, the parameter module 114 includes a rib collapsing module 116 and a corner breaking module 118. The rib collapsing module 116 and the corner breaking module 118 are discussed in greater detail with respect to FIGS. 5A-8, but briefly, these components are configured to make adjustments to the initial parameterization that enable synthesis of more natural appearing corner sections in a curved, digital brush stroke.

In some embodiments, other parameters that are determined include start and stop points, indicating the beginning and ending of a brush stroke. Parameters may further include a stroke outline, indicating the boundary of the digital brush stroke. The stroke outline may align with the silhouette of the input stroke or may include a margin to preserve boundary effects, such as feathering. This parameterization may be done by the parameter module 114, for instance, in accordance with the methods described in Lu et al., Real-Brush: Painting with Examples of Physical Media (2013) (hereinafter referred to as Lu).

As parameterization identifies ribs 204, each rib 204 defines a sample within the input stroke. Based on the determined parameters, the matching module 120 matches the samples to exemplar brush stroke segments to generate the digital brush stroke. The exemplar brush stroke segments may already include the texture of the user's desired media, such as oil paint or acrylic paint, that will be applied to the input stroke to create the digital brush stroke. The exemplar brush stroke segments may be part of a library of exemplar brush stroke segments stored within storage, such as storage 106. The exemplar brush stroke segments may be pre-loaded within the library or may be imported by the user. For example, users may build their own libraries of exemplar brush stroke segments by capturing and uploading images of physical brush strokes using various media and techniques. In some aspects, these exemplar brush stroke samples are parameterized in the same manner as the input stroke 200 to allow for matching of the samples of the input stroke 200 to exemplar brush stroke segments. The matching module 120 matches the samples on an individual sample basis or as sets of samples. Additionally, in some embodiments, the matching module 120 performs matching upon a trigger such as, for instance, receiving a certain threshold number of samples. Alternatively, the matching module 120 performs matching continuously as each sample is received.

As matching occurs, the synthesis module 122 of the brush stroke synthesis engine 110 uses the exemplar brush stroke segments determined to be best matches for the samples to synthesize a digital brush stroke in accordance with the parameters of the input stroke and any other criteria received for the digital brush stroke. Synthesis may include, at least, warping the exemplar brush stroke segments to fit the samples to which they match and merging adjacent strokes using blending techniques. In some embodiments, the synthesis done by the synthesis module 122 further includes considerations for interactions between brush strokes when the user provides an input stroke that at least partially overlaps with a previously generated brush stroke. Example matching and synthesis techniques that may be used in connection with the disclosed embodiments include those techniques described in Lu.

Upon synthesis of the digital brush stroke, the digital brush stroke is displayed to the user by the display module 124. The display module 124 may display the digital brush stroke on one or more display components, such as presentation components 1016 of the computing device 1000 in FIG. 10. The display module 124 generally displays segments of the digital brush stroke as the segments are synthesized. In other words, the segments are displayed in real time or near real time.

As previously mentioned, the greater number of samples available for matching generally provides for greater accuracy in matching the samples to exemplar brush stroke segments, producing a more natural appearance for the digital brush stroke. However, waiting for more samples for matching and synthesis creates an undesirable delay in providing visual feedback to the user. As such, embodiments of the present disclosure perform localized optimization with matching and brush stroke synthesis for small sets of samples. To provide greater accuracy in matching with smaller sized sample sets, the matching module 120 performs matching for samples multiple times. Specifically, the matching module 120 performs matching for a set of samples a first time and then performs matching for that set of samples a second time in conjunction with matching for subsequently received samples. Based on the exemplar brush stroke segments matched in the first instance, the synthesis module 122 generates a temporary segment, which is displayed to the user by the display module 124. The synthesis module 122 then generates a permanent segment to replace the temporary segment based on the second matching, which is determined from more samples. In example embodiments, once the permanent segment is optimized, its appearance is finalized and immutable until the drawing is finished. In contrast, the optimization on the temporary segment gives an initial appearance but becomes re-matched and re-rendered at the next time optimization occurs. By replacing the initial temporary segment with a permanent segment having a finalized appearance, instead of with another temporary segment, the user is given a greater degree of certainty in the appearance of the portion of the brush stroke already synthesized.

Using permanent and temporary segments allows for local optimization that provides the user with visual feedback in real time or near real time while providing enough information on the input stroke for the brush stroke synthesis engine 110 to make intelligent matching and synthesis decisions. The table provided below illustrates the concept of using temporary and permanent segments. Each row in the table corresponds to a point in time at which an optimization occurs, and each column corresponds to a sample along an input stroke.

| | \multicolumn{15}{c}{Sample Index} |
|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 |
| t = 1 | T1 | | T2 | | | | | | | | | | | | |
| t = 2 | P1 | | P2 | T1 | | T2 | | | | | | | | | |
| t = 3 | | | | P1 | | P2 | T1 | | T2 | | | | | | |
| t = 4 | | | | | | | P1 | | P2 | T1 | | T2 | | | |
| t = 5 | | | | | | | | | | P1 | | | | | P2 |

The table above indicates the locations of permanent and temporary segments for each time optimization is triggered. T1 and T2 indicate the start and end, respectively, of a temporary segment, and P1 and P2 indicate the start and end, respectively of the latest permanent segment generated. In this example, there are fifteen samples within the input stroke, and optimization is triggered five times. When drawing first starts, at t=1, the entire beginning of the rendered brush stroke is a temporary segment. This temporary segment is based on a first set of samples, samples 1, 2, and 3. At t=2, a second set of samples, comprising samples 4, 5, and 6, are processed in conjunction with the first set of samples. The temporary segment in the previous time interval now becomes a permanent segment while a new temporary segment is generated for the second set of samples. Continuing to t=3, a third set of samples, samples 7, 8, and 9, has been received and is processed with the second set of samples. The previous temporary segment representing samples 4, 5, and 6 is replaced with a new permanent segment, and a new temporary segment is generated for the third set of samples.

Continuing, at t=4, a fourth set of samples comprising samples 10, 11, and 12, are received and processed in conjunction with the third set of samples. A permanent segment is created to replace the temporary segment for the third set of samples generated at t=3, and a new temporary segment is generated for the fourth set of samples. Finally, at t=5, a fifth set of samples comprising samples 13, 14, and 15 are received and processed in conjunction with the fourth set of samples. The fifth set of samples represents the end of the user's input stroke, meaning no more samples will be received for this brush stroke. As with previous samples sets, a new permanent segment is generated to replace the previous temporary segment for the fourth set of samples. Additionally, because no more input will be received for adjusting a temporary stroke, the fifth set of samples are represented in the permanent stroke, without the creation of an initial temporary segment. In other words, when the entire brush stroke is finished, the samples left to be synthesized become a permanent segment.

It is noted that the above table indicates only the permanent segment rendered for that specified time interval. As such, though the table does not explicitly indicate a permanent segment existing for samples 1, 2, and 3 at t=3, the permanent segment generated for samples 1, 2, and 3 at t=2 would still exist and be displayed to the user. Additionally, though the table above and this disclosure refer to discrete temporary and permanent segments, each temporary segment is continuous with the abutting permanent section. For instance, the temporary segment for samples 4, 5, and 6 is displayed as continuous with the permanent segment for samples 1, 2, and 3.

In this example, optimization is not triggered by receipt of each sample but, instead, is triggered when a threshold number of samples are received. Use of a threshold number of samples for triggering optimization represents a balance between visual delay and superior matching and brush stroke synthesis. If the number of samples used to trigger optimization is too large, there is a perceivable visual delay. But if the number of samples is too small, matching and brush stroke synthesis will yield inferior results for the rendered digital brush strokes.

The threshold number of samples depends on sample spacing between samples. If sample spacing is smaller, a larger threshold number of samples may be tolerable before the user is limited by visual delay. But if the sample spacing is large, a smaller threshold value may be more appropriate. Further, the threshold number may also vary based on the media used as different media would behave differently when used for physical paintings. For instance, wet media, such as watercolor, is subject to greater change in appearance for a period of time after a physical brush stroke is painted, while a user would expect little to no change to a physical brush stroke when using dry media, such as pencil or pastel. Accordingly, in some embodiments, the threshold value is set to a greater number when wet media is selected compared to dry media because uncertainty in the appearance for a greater amount of time may be expected and tolerated. In the example illustrated in the above table, the threshold number of samples for triggering matching and synthesis is three; however, it is contemplated that other numbers of samples may be used for the threshold value.

After an optimization occurs, the user continues to input more samples before the threshold number of samples is reached to trigger the next optimization. Some aspects mitigate the visual delay during the time the threshold number of samples are being received by estimating future temporary segments based on the matching that occurred during the previous optimization. In some embodiments, the last sample received for the last optimization is incrementally extended for samples received but not yet optimized. For example, referencing the table above, as a user inputs samples 7 and 8 during the time between t=2 and t=3, those samples are not yet matched because optimization will not be triggered until the ninth sample is received. In some embodiments, the exemplar brush stroke segment matched to sample 6 by the matching module 120 is used to provide a rough estimate of exemplar brush stroke segments for samples 7 and 8 before the next optimization is triggered. For example, if sample 6 was matched with the 10th sample of exemplar brush stroke segment 5 from an exemplar brush stroke segment library, it may be estimated that the next two samples from exemplar brush stroke segment 5 (i.e., the 11th and 12th samples) provide a match for samples 7 and 8, respectively. As such, the display module 124 may display an estimated temporary segment continuous with the previous temporary segment created at t=2 using the 11th and 12th samples of the exemplar brush stroke segment 5. When sample 9 is subsequently received, optimization is then triggered for samples 7, 8, and 9 to determine the correct matching and appearance for those samples. The estimated segment generated for samples 7 and 8 is replaced by the temporary segment.

Figure 3:
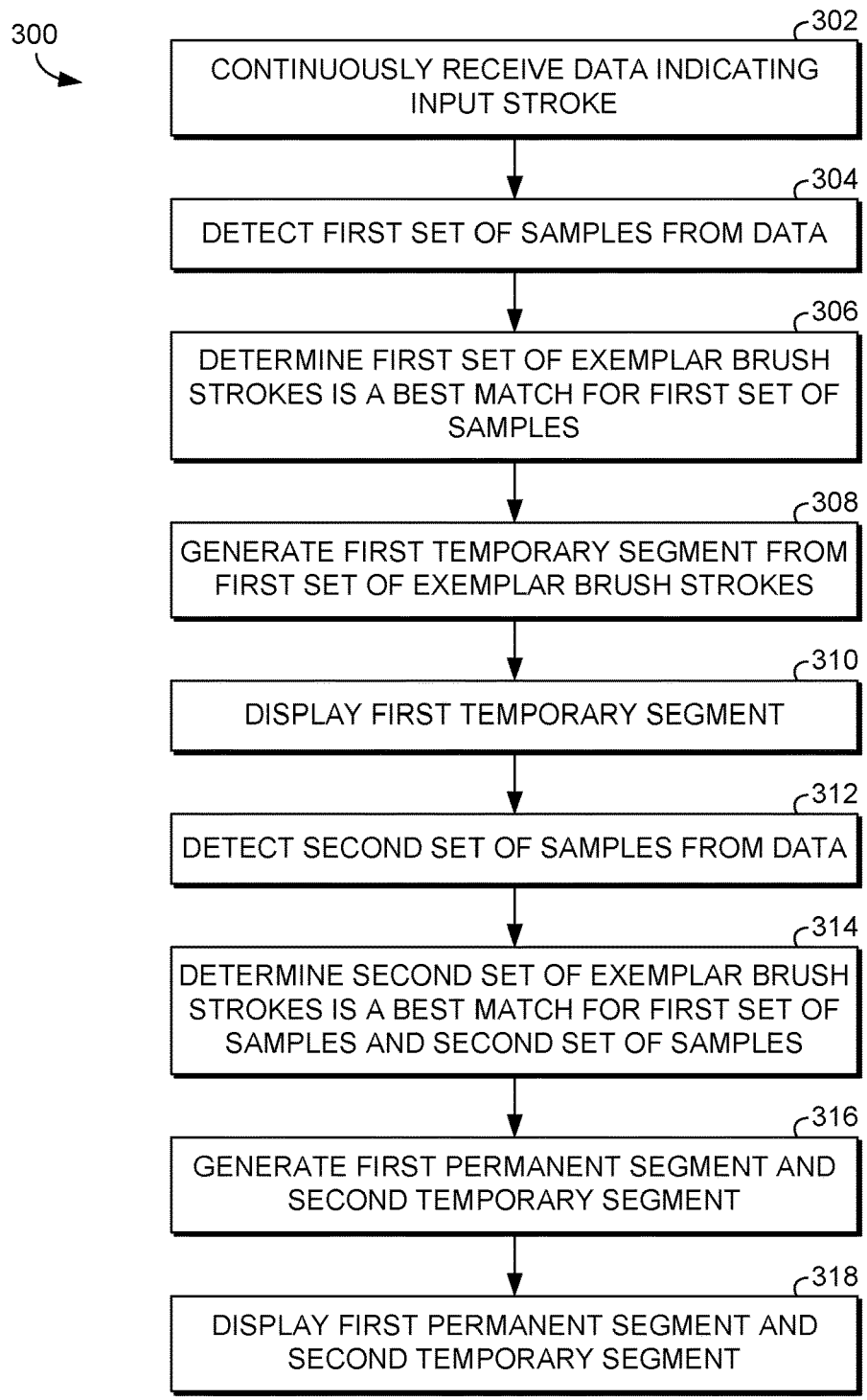
FIG. 3 depicts a flow diagram illustrating an example method of continuous pattern matching to generate a digital brush stroke in accordance with some implementations of the present disclosure.

Tuning to FIG. 3, a flow diagram depicting a method 300 for generating a digital brush stroke with continuous pattern matching in accordance with embodiments of the disclosure is provided. Each block of the method 300 and any other methods described herein comprises a computing process performed using any combination of hardware, firmware, and/or software. For instance, various functions can be carried out by a processor executing instructions stored in memory. The methods can also be embodied as computer-usable instructions stored on computer storage media. The methods can be provided by a standalone application, a service or hosted service (standalone or in combination with another hosted service), or a plug-in to another product, to name a few. The method 300 may be performed at least in part, for instance, by the brush stroke synthesis engine 110 of FIG. 1.

Initially, as shown in block 302, data indicating an input stroke is continuously received. This data may be received by the receiving module 112 from FIG. 1 through the use of one or more input devices. For instance, a user may be providing data indicating an input stroke by moving a stylus along a touchscreen of a computing device. This data is continuously received contemporaneously as the user moving the stylus. Other data may also be received, including data relating to various criteria for the desired brush stroke such as color, texture, brush size, and the like.

As the data is being continuously received, a first set of samples is detected from the data, as shown in block 304. These samples may be portions of the input stroke between adjacent ribs. The first set of samples may comprise a threshold number of samples needed to trigger optimization. If the threshold number of samples is five, for instance, the method would include detecting the first five samples within the input stroke.

A first set of exemplar brush stroke segments are determined to be a best match with the first set of samples, as shown in block 306. Determining a first set of exemplar brush stroke segments is a best match for the first set of samples may include the matching module 120 from FIG. 1 comparing data indicating the first set of samples of the input stroke to a plurality of exemplar brush stroke segments. The exemplar brush stroke segments may be saved as a library of exemplar brush stroke segments. Once a match is determined, a first temporary segment is generated from the first set of exemplar brush stroke segments, as indicated by block 308. This may be performed by the synthesis module 122 in FIG. 1. The first temporary segment is then displayed to the user, as shown in block 310.

The method 300 further includes, as shown in block 312, detecting a second set of samples from the data indicating an input stroke. This second set of samples may be detected in the same manner as the first set of samples. The second set of samples may be continuous with the first set. In other words, the second set of samples is received immediately after the first set of samples is received. In some embodiments, this second set of samples comprises the same number of samples as those detected in the first set, such as a threshold number. In alternative embodiments, however, the second set of samples includes a different number of samples than the first set.

Based on at least the first set of samples and the second set of samples, a second set of exemplar brush stroke segments is determined to be a best match for the first set of samples and the second set of samples, as indicated at block 314. This matching may be done in a similar manner to the matching of the first set of samples. A first permanent segment and a second temporary segment are generated from the second set of exemplar brush stroke segments, as shown in block 316. This step may be similar to the generation of the first temporary segment except that two segments—the first permanent segment and the second temporary segment—are generated from this second set of samples. The first permanent segment and the second temporary segment are then displayed, as shown in block 318. The first permanent segment replaces the first temporary segment and is displayed with the second temporary segment as a continuous brush stroke. The second temporary segment may be subject to change during a following optimization while the first permanent segment has a final appearance that will not change merely as result of subsequent optimizations. This method 300 may continue for additional sets of samples. For instance, a third set of samples may be detected and used to generate a second permanent segment to replace the second temporary segment and a third temporary segment.

Figure 4A:
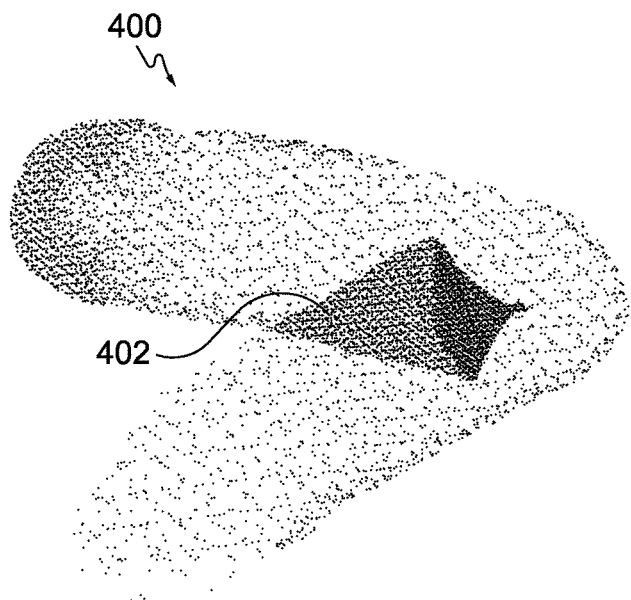
FIGS. 4A-B depict a curved, digital brush stroke created by traditional methods and a curved, digital brush stroke created in accordance with implementations of the present disclosure, respectively.

This method of utilizing incremental pattern matching and brush stroke synthesis with temporary and permanent segments allows for better handling of curvy strokes because incremental adjustments may be made to correct issues with corner segments of the brush stroke. As previously mentioned, during initial parameterization, an input path line and ribs are applied to determine the parameters of the input stroke. This parameterization, however, can lead to artifacts being rendered in corners of a curvy brush stroke. FIG. 4A displays a rendered brush stroke 400 having such an artifact 402. The artifact 402 is caused by intersecting ribs being used during the matching and synthesis process.

To correct this issue, embodiments of the parameter module 114 in FIG. 1 includes a rib collapsing module 116 to adjust the ribs upon detection of intersecting ribs. Additionally, as discussed in greater detail below with respect to FIGS. 7A-B, the parameter module 114 includes a corner breaking module 118 to correct distortion that sometimes results from rib collapsing. Together, the rib collapsing module 116 and the corner breaking module 118 provide a rounded, natural-looking corner of a curve without artifacts resulting from traditional parameterization, which is shown by the corrected brush stroke 410 in FIG. 4B.

Focusing on the rib collapsing module 116, FIGS. 5A-5C illustrate how the ribs are adjusted in accordance with embodiments of the disclosure. In FIG. 5A, an input stroke 500 with an input path line 502 and ribs 504 are shown. Each rib 504 includes a first portion 506 on one side of the input path line 502 and a second portion 508 on the other side. As samples are detected from the received data and parameters are determined with the addition of ribs 504, the rib collapsing module 116 detects intersecting ribs. Specifically, the rib collapsing module 116 may determine whether a rib intersects with an immediately adjacent rib. If the newly added rib does not intersect with the adjacent rib, it is not adjusted. If the ribs do intersect, any rib within the temporary segment that intersects may be collapsed. As used herein, "collapsed" means adjusted such that the respective endpoints of the ribs meet or come together at a single meeting point, which is the only place where the ribs meet. In other words, the collapsed ribs come together at a meeting point positioned at their respective endpoints, rather than transecting one another. The adjustments that are made may vary and may comprise increasing rib length, decreasing rib length, increasing the angle between the rib and the input path line, and/or decreasing the angle between the rib and the input path line. Adjustments may be made to the portion of the rib that intersects another rib while the portion of the rib not involved in intersection may remain unmodified. As the adjusted, intersecting portion will be on an interior side of a corner, the adjusted portion may be referred to as an interior section, and the unadjusted portion may be the exterior portion. In some aspects, when determining which ribs to collapsed, only samples after a previous corner section are considered so that adjustments made for a new corner section do not interfere with the shape of a previous corner.

Looking to FIG. 5A, there are ribs 504A-G that have already been collapsed to meet at a single meeting point 514. The rib collapsing module 116 determines that a new rib 504H intersects an adjacent rib 504G as well as ribs 504A-F, triggering additional rib collapsing as shown in FIG. 5B. In FIG. 5B, the new rib 504H no longer intersects ribs 504A-G. Instead, new rib 504H has been adjusted so that its endpoint 512 meets the endpoints of ribs 504A-G at meeting point 514. Only the first portion 506 (i.e., the interior portion) of the new rib 504H that intersected with other ribs was adjusted while the second portion 508 (i.e., the exterior portion) of the new rib 504H was not adjusted.

This process continues as a corner section continues to be created. FIG. 5C illustrates input stroke 500 after several more samples have been received. As the rib collapsing module 116 determined that the ribs 504I-Q intersected with at least an adjacent rib, each rib 504I-Q was collapsed such that the endpoints meet at the single meeting point 514. As seen by comparing the meeting point 514 in FIGS. 5B-C, the location of the meeting point 514 may be determined by all the ribs that meet at the meeting point 514 and, therefore, may move as the additional ribs 504I-Q are collapsed. Additionally, when the meeting point 514 moves, the previously collapsed ribs 504A-H may be collapsed again and adjusted in a way so that the endpoints of ribs 504A-H continue to meet at the meeting point 514. Further, there may be times, particularly with sharp corners, when newly added ribs intersect ribs that were not previously intersecting. For instance, ribs 504R-S in FIG. 5C were added prior to ribs 504A-H but were not were not previously intersecting ribs in FIG. 5A-B. However, one or more of the additional ribs 504I-Q may have intersected with ribs 504R-S, causing ribs 504R-S to be collapsed as well.

Figure 6:
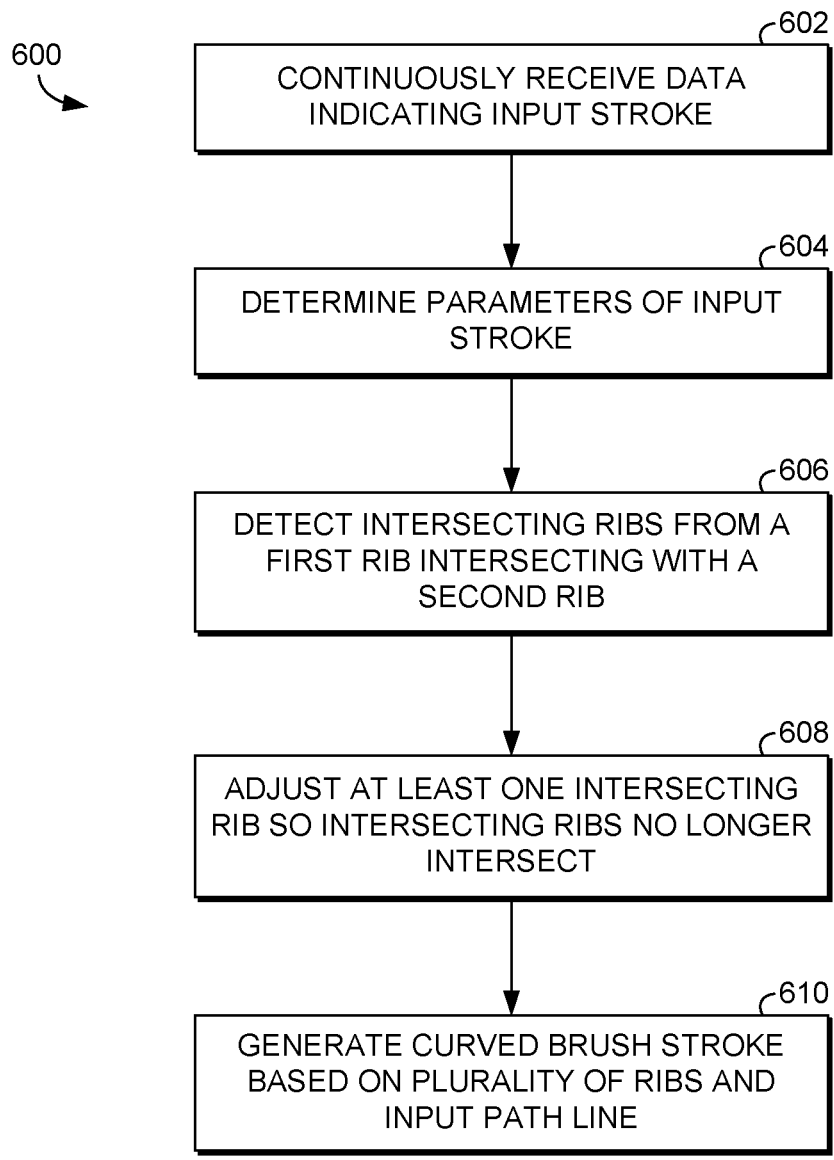
FIG. 6 depicts a flow diagram illustrating an example method of generating a curved, digital brush stroke in accordance with some implementations of the present disclosure.

FIG. 6 provides a flow diagram illustrating the method 600 of handling corner sections with rib collapsing in accordance with embodiments of the disclosure. At block 602, data indicating an input stroke is continuously received. This step may be done by the receiving module 112 from FIG. 1. As the data is received, parameters of the input stroke are determined, as indicated at block 604. The parameters may be determined by an input path line that runs parallel to the input stroke and representing the center of the input stroke and ribs transecting the input path line. Each rib may comprise at least one endpoint distal to the input path line.

After the initial parameterization, a first rib is detected as intersecting with at least a second rib, which is provided in block 606. The first rib may be adjacent to the second rib and may immediately precede the second rib. One or more of the intersecting ribs are adjusted so that the ribs no longer intersect, as shown in block 608. For instance, the first rib and/or the second rib may each be adjusted so that the endpoint of the first rib and the endpoint of the second rib come together at a first meeting point. This first meeting point may be the only point at which the first rib and the second rib meet. The detection of intersecting ribs and the adjustments may be performed by the rib collapsing module 116 of FIG. 1.

As indicated at block 610, a curved, digital brush stroke is generated based on the ribs and the input path line. The generation of the brush stroke may be done through matching samples to exemplar brush stroke segments and synthesizing the digital brush stroke from the matched exemplar brush stroke segments, as described with respect to FIGS. 1-3.

Though not shown FIG. 6, the method may further include collapsing additional ribs. For instance, the method may comprise detecting a third rib intersects with the second rib, the third rib being adjacent to the second rib. At least one of the intersecting ribs, such as the third rib, may be adjusted so that the endpoint of the third rib meets with endpoints of the first and second rib at the meeting point. The meeting point may be moved from a first location after the initial adjustment of the second rib to a second location after the adjustment of the third rib. The first rib and/or the second rib may also be adjusted to allow for movement of the meeting point.

Figure 4B:
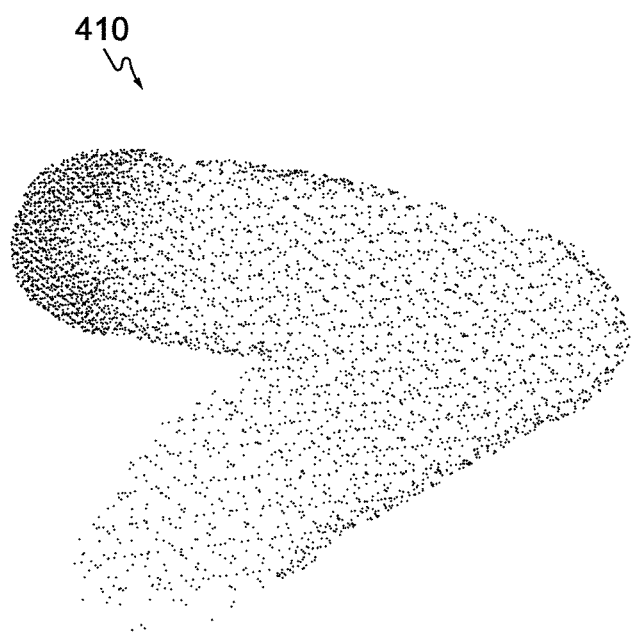

By utilizing rib collapsing in accordance with embodiments of this disclosure, the curved section of the digital brush stroke, as shown by FIG. 4B, does not have artifacts. However, the adjustments to the ribs may result in noticeable texture stretching and/or shape distortion. This problem typically occurs when the corner has a sharp turning angle. To mitigate the stretching and distortion, some embodiments of the parameter module 114 in FIG. 1 also includes a corner breaking module 118. The corner breaking module 118 detects when distortion occurs. Detection may occur after ribs are collapsed and when new ribs are no longer intersecting with other ribs. In other words, detection may occur upon the completion of a corner section.

Figures 7A, 7B:
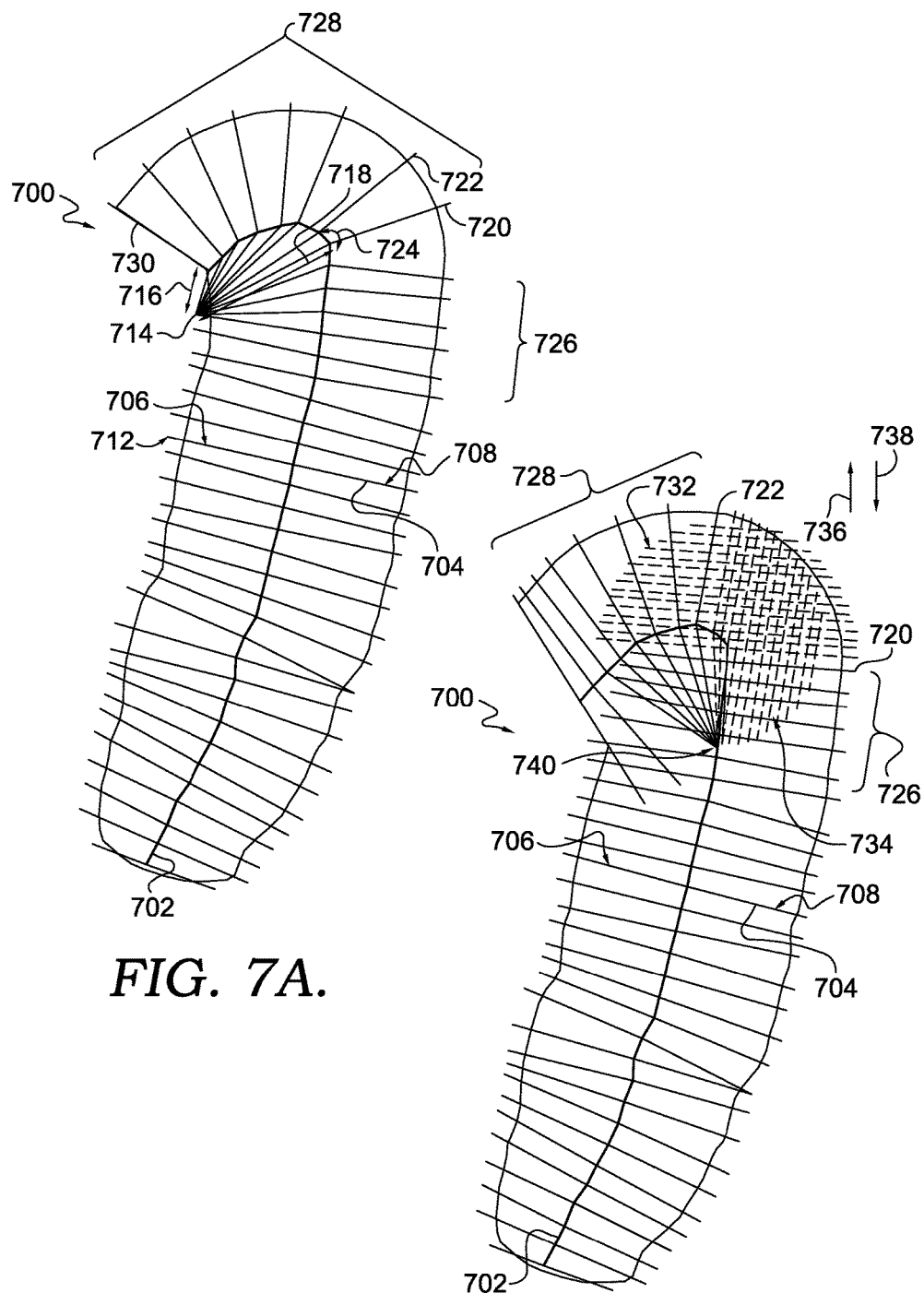
FIGS. 7A-B depict parameterization of a curved, digital brush stroke in accordance with further implementations of the present disclosure.

To detect corner distortion, the corner breaking module 118 determines whether a length of at least a portion of a rib is outside of one or more threshold values. For example, a first portion of a rib may have a length between the input path line and an endpoint point distal to the input path line. The length may be changed when the first portion of the rib is adjusted during rib collapsing so that the endpoint of the rib meets with other intersecting ribs at a single meeting point. Distortion may be detected when it is determined that the length of the rib in the collapsed form is either too great or too small relative to the length of the rib non-collapsed form, i.e., the length of the rib before rib collapsing occurred. When distortion is detected, the corner breaking module 118 scans through previous samples in the corner section to identify a breaking sample and a post-breaking sample. The breaking sample is a sample having the greatest turning angle between two exterior portions of ribs, and the post-breaking sample is a sample immediately following the breaking sample. The brush stroke is divided at the breaking sample into a pre-break segment and a post-break segment. The corner breaking module 118 inserts corner structures between the pre-break and post-break segments by extending the breaking sample in a forward direction and extending the post-breaking sample in a backward direction. The corner structures may help provide a rounded and natural-looking corner without shape or texture distortion. In some embodiments, previously collapsed ribs are restored to non-collapsed form before corner structures are inserted. FIGS. 7A-B illustrate the corner breaking processes performed by the corner breaking module 118.

FIG. 7A depicts an input stroke 700 after rib collapsing. The input stroke 700 has an input path line 702 and ribs 704.

Each rib 704 comprises a first portion 706 on one side of the input path line 702 and a second portion 708 on the opposite side of the input path line 702. Because the input stroke 700 comprises a corner section, the first portions 706 may also be referred to as interior portions, and the second portions 708 may also be referred to as exterior portions. Each first portion 706 comprises a length between the input path line 702 and an endpoint 712 of the first portion 706, the endpoint 712 being distal to the input path line 702.

As ribs are collapsed by the rib collapsing module 116, the corner breaking module 118 looks for corner distortion by determining whether the length of each first portion 706 of a collapsed rib 704 is outside one or more threshold values. The threshold values may be determined by the length of the first portion 706 in a non-collapsed form. For example, in some configurations, distortion is determined to be present where the length in collapsed form is either greater than or equal to 150% of the length in non-collapsed form or less than 50% the length in non-collapsed form. Different threshold values may be used in other embodiments. In some embodiments, the rib collapsing module 116 considers the length of each first portion 706 of a collapsed rib 704 to determine whether the length falls outside of the threshold values. In other aspects, distortion is detected for a segment by looking only at the length of the shortest first portion 706, which is shown as arrow 716 in FIG. 7A, and the length of the longest first portion 706, indicated by arrow 718. Further, in some embodiments, the corner breaking module 118 detects distortion as each segment is optimized, and in other aspects, distortion is detected only when the new rib stops intersecting with previous rib.

When distortion is detected, the corner breaking module 118 identifies the breaking sample, which is used to break the stroke into a post-break segment and a pre-break segment. The breaking sample may be the sample with the greatest turning angle. In FIG. 7A, the breaking sample 720 is found to have the greatest turning angle 724. The sample immediately following the breaking sample 720 is referred to as the post-breaking sample 722. Input stroke 700 is broke into two segments at the breaking sample 720. The pre-break segment 726 may comprise samples from the beginning of the current segment to the breaking sample 720, and the post-break segment 728 may comprise samples from the post-breaking sample 722 to the most recent sample 730.

As shown in FIG. 7B, the corner breaking module 118 re-restores previously collapsed ribs into a non-collapsed form. When restoring ribs 704, only samples within the current corner section in which distortion is detected may have ribs 704 restored to prevent interference with previous portions of the brush stroke. Because the collapsed ribs 704 had caused the distortion that the corner breaking module 118 seeks to fix using corner structures, restoring the ribs 704 is done to remove the distortion so that the corner structures are not based on the ribs 704 in the distorted form. It may be noted, however, that not all the ribs 704 in FIG. 7B appear as restored. Once corner structures are inserted to fix the distortion within the corner, some of the ribs 704 may be collapsed again if necessary to remove artifacts, which is what has happened in FIG. 7B.

After ribs are restored, the corner breaking module 118 inserts corner structures between the pre-break segment 726 and the post-break segment 728. The corner structures in FIG. 7B are depicted in dashed lines. A first corner structure 732 may be created by extending the breaking sample 720 forward along a tangential direction and inserting vertices in that direction to form a semicircular structure, shown by the substantially horizontal dashed lines in FIG. 7B. To extend "forward," as used herein, means to extend towards more recent samples in the direction the user is drawing the input stroke 700, which is shown by arrow 736 in FIG. 7B. As such, the first corner structure 732 is extended from the breaking sample 720 toward the post-breaking sample 722. In some embodiments, such as the one shown in FIG. 7B, the first corner structure extends beyond the post-breaking sample 722. The tangential direction for the first corner structure 732 is determined by the tangential line based on the breaking sample 720 and samples before the breaking sample 720. For example, if the breaking sample 720 is "i" and the post-breaking sample is "i+1", then the tangent line for the first corner structure 732 may be calculated as $P\_i - P\_i-2$.

Similarly, the second corner structure 734 is created by extending the post-breaking sample 722 backward along the tangential direction and inserting vertices in that direction to form another semicircular structure, shown by the substantially vertical dashed lines in FIG. 7B. As used herein, extending "backward" means to extend towards earlier samples in a direction opposite of the direction that the user is drawing the input stroke 700, which is shown by arrow 738 in FIG. 7B. In other words, the second corner structure 734 extends from the post-breaking sample 722 to beyond the breaking sample 720. The tangential direction for the second corner structure 734 is determined by the tangential line calculated from the post-breaking sample 722 and samples after the post-breaking sample 722. For instance, if the breaking sample 720 is "i" and the post-breaking sample is "i+1", then the tangent line for the second corner structure 734 may be calculated as $P\_i+3 - P\_i+1$.

Because the first corner structure 732 extends forward from the breaking sample 720 and the second corner structure 734 extends backward from the post-breaking sample 722, the first corner structure 732 and the second corner structure 734 may overlap between the breaking sample 720 and the post-breaking sample 722. In some embodiments, the first corner structure 732 and the second corner structure 734 are perpendicular to each other.

As previously mentioned, in some embodiments, the ribs 704 are collapsed as needed. As shown in FIG. 7B, some ribs 704 in the post-break segment 728 are collapsed while other ribs 704, including all the ribs 704 in the pre-break segment 726, are left in their restored, non-collapsed forms. The ribs 704 in the post-break segment 728 that have been re-collapsed now converge toward a new meeting point 740. The new meeting point 740 is in a different location than the meeting point 714 from the initial collapsing because not all the ribs 704 that were previously collapsed and meeting at the meeting point 714 are being collapsed again. As with the initial collapsing, ribs 704 will start to be collapsed when the rib 704 intersects with an immediately adjacent rib, as explained above with respect to FIGS. 5A-C.

Figure 9:
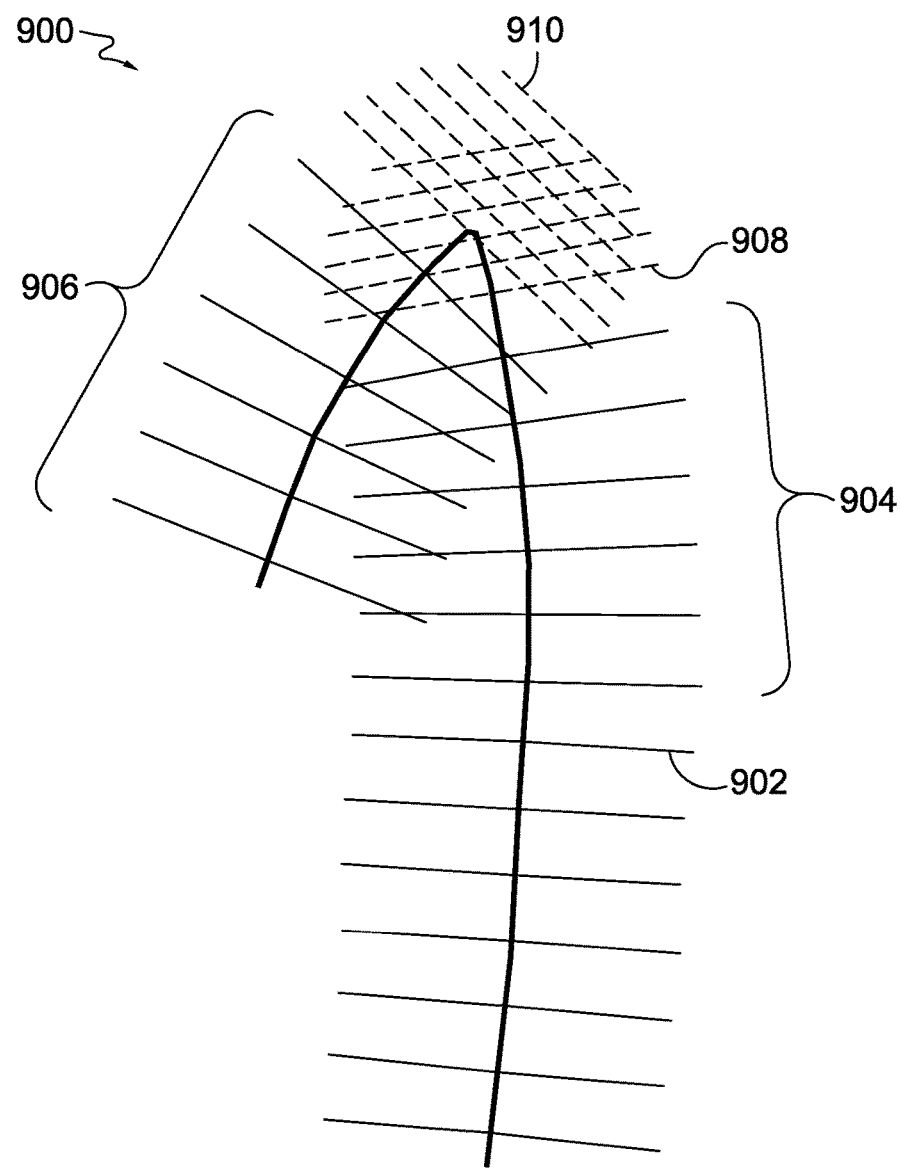
FIG. 9 depicts parameterization of a curved, digital brush stroke in accordance with further implementations of the present disclosure.

Some brush strokes, however, will not require any ribs to be restored after the corner structures are inserted. Turning briefly to FIG. 9, an input stroke 900 after corner structures 908 and 910 are inserted is provided. This input stroke 900 has a very sharp turning angle and, as such, no ribs 902 on either the pre-breaking segment 904 or the post-breaking segment 906 are re-collapsed. While restored ribs 902 in the pre-break segment 904 intersect with ribs 902 in the post-break segment 906, ribs 904 do not intersect other ribs 904 within the same segment and, therefore, are not collapsed again.

When corner structures are inserted and ribs re-collapsed, if needed, brush stroke synthesis may occur based on texture coordinates. To synthesize the portion of the brush stroke for the corner structures, the texture coordinates are derived from the coordinates of known samples. Specifically, turning back to FIG. 7, the texture coordinates for the first corner structure 732 are derived from the texture coordinate at the breaking sample 720, and texture coordinates for the second corner structure 734 are derived from the post-breaking sample 722. The first corner structure 732 may be matched to samples in numerical order beginning with the sample immediately following the sample to which the breaking samples was matched. For instance, if the breaking sample 720 is matched to the 10th sample of exemplar brush stroke segment 5, samples within the first corner structure 732 may be matched to the 11th, 12th, 13th, to the Nth sample in the exemplar brush stroke segment 5, depending on how many samples are within the first corner structure 732. Matching for the second corner structure 734, on the other hand, may be in reverse numerical order beginning with the exemplar brush stroke segment sample immediately before the sample to which the post-breaking sample matches. For example, if the post-breaking sample 722 is matched to the 11th sample of the exemplar brush stroke 5, samples within the second corner structure 734 may be matched to the 10th, 9th, and 8th sample in the exemplar brush stroke segment 5. The first corner structure 732 and the second corner structure 734 together create a rounded and natural looking corner without shape distortion or texture stretching.

It is noted that while the examples for matching samples provided above matched samples in increments or decrements of 1, the increment or decrement used in matching depends on the sampling rates used for the first and second corner structures 732 and 734, respectively. Higher sample rates for the first and second corner structures 732 and 734, respectively, cause the matching to occur in increments and decrements less than 1.

Figure 8:
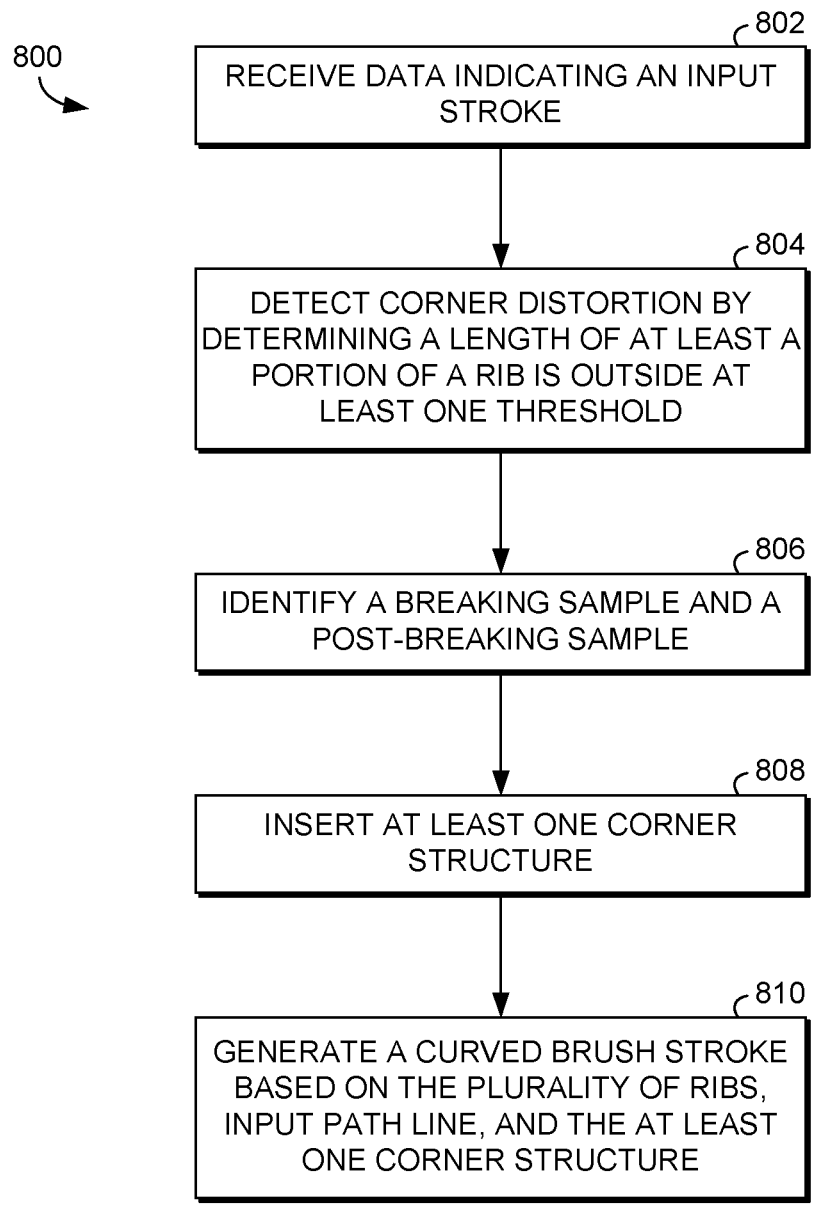
FIG. 8 depicts a flow diagram illustrating an example method of generating a curved, digital brush stroke in accordance with further implementations of the present disclosure.

A method 800 of creating a digital, curved brush stroke with corner breaking in accordance with embodiments of the disclosure is depicted in the flow diagram provided in FIG. 8. As shown in block 802, data indicating an input stroke is received by, for instance, the receiving module 112 of FIG. 1. Initial parameters may be applied to the input stroke. Specifically, the input stroke may include an input path line that represents a line in the center of the input stroke and running parallel to the input stroke. The input stroke may further include ribs transecting the input path line. Each rib may comprise a first portion extending along a first side of the input path line and a second portion extending along a second side of the input path line. Each first portion may comprise a length between the input path line and an endpoint of the first point that is distal to the input path line.

As indicated by block 804, the method further includes detecting corner distortion by determining the length of at least a portion of a rib, such as the first portion, is outside one or more threshold values. This step may be performed by the corner breaking module 118 of FIG. 1. Detecting corner distortion occurs after intersecting ribs have been collapsed by the rib collapsing module 116 of FIG. 1. As such, determining the length of at least a portion of the rib is outside one or more threshold values may include determining the length of the first portion of the rib in a collapsed form is outside threshold values based on the length of the first portion of the rib in a non-collapsed form. For example, in some embodiments, distortion is detected when the length of first portion in collapsed form either greater than or equal to 150% of the length of first portion in non-collapsed form or is less than 50% of the length of the first portion in non-collapsed form.

Upon detecting corner distortion is present, a breaking sample and a post-breaking sample are identified, as shown in block 806. The breaking sample is a sample with the greatest turning angle, or the greatest angle along the input path at a sample. The post-breaking sample is a sample immediately following the breaking sample. The input stroke is divided at the breaking sample into a pre-break and a post-break segment. At block 808, at least one corner structure is inserted within the corner region. In some aspects, a first corner structure and a second corner structure are inserted between the breaking sample and the post-breaking sample. The first corner structure may comprise first vertices extending from the breaking sample to at least the post-breaking sample, and the second corner structure may comprise second vertices extending from the post-breaking sample to at least the breaking sample. In some aspects, the first corner structure continues to at least one or more samples immediately following the post-breaking sample, and the second corner structure continues to at least one or more samples immediately preceding the breaking sample.

Inserting the first corner structure and the second corner structure may include re-adjusting one or more intersecting ribs into non-collapsed form, inserting the first vertices using texture coordinates of the breaking sample, and inserting the second vertices using texture coordinates of the post-breaking sample. The first vertices may extend in a first direction corresponding to a line tangential to the breaking sample while the second vertices extend in a second direction correspond to a line tangential to the post-breaking sample.

A curved, digital brush stroke is generated based on at least the ribs, the input path line, and the at least one corner structure, such as the first and second corner structures, as shown in block 810. The generation of the brush stroke may be done by matching texture coordinates of the samples to exemplar brush stroke segments and synthesizing a digital brush stroke from the exemplar brush stroke segments and the parameters of the input stroke. The samples within the first corner structure may be matched to samples of the same exemplar brush stroke segment to which the breaking sample is matched and, specifically, may be matched to samples sequentially following the sample of the exemplar brush stroke segment to which the breaking sample is matched. Similarly, the samples within the second corner structure may be matched to samples of the same exemplar brush stroke segment to which the post-breaking sample is matched and may be matched to samples preceding the sample to which the post-breaking sample is matched in reverse numerical order.

Figure 10:
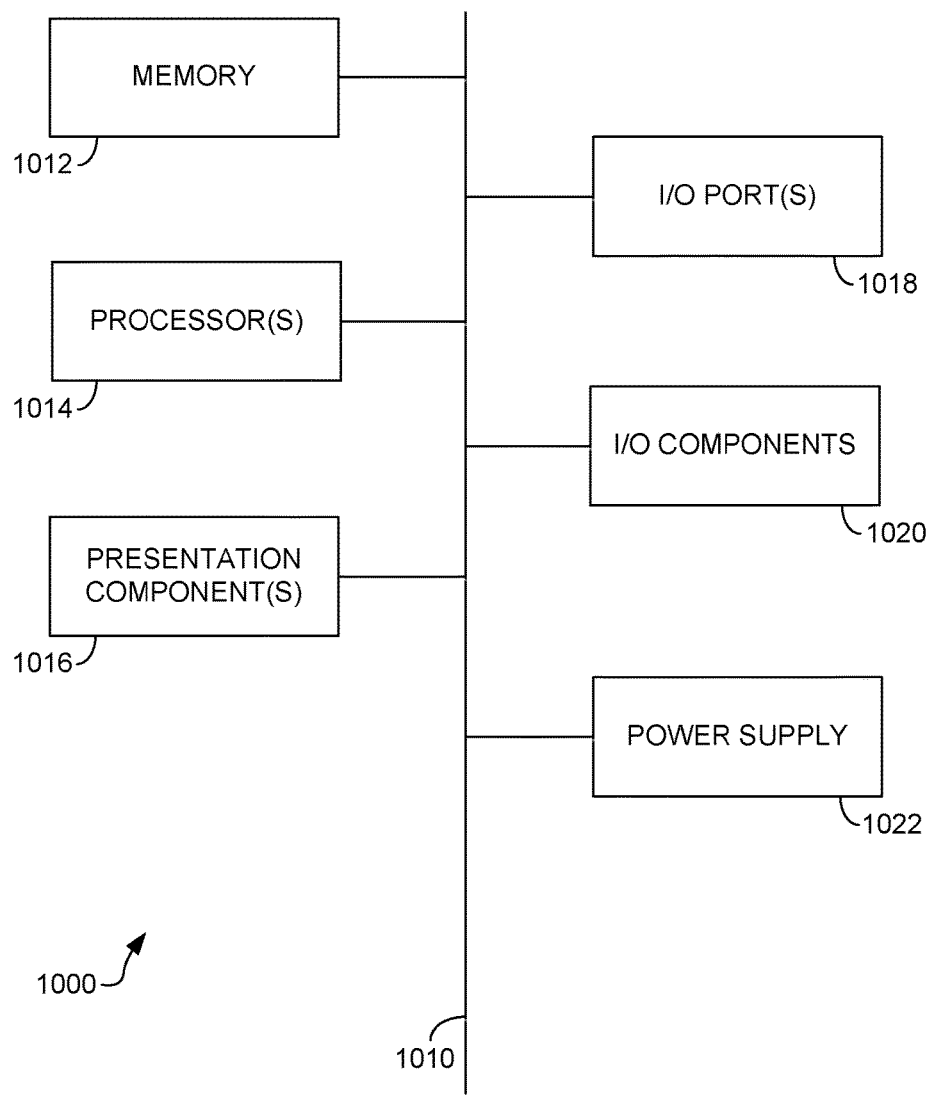
FIG. 10 depicts a block diagram of an exemplary computing environment suitable for use in implementations of the present disclosure.

Having described embodiments of the present invention, an exemplary operating environment in which embodiments of the present invention may be implemented is described below in order to provide a general context for various aspects of the present invention. Referring initially to FIG. 10 in particular, an exemplary operating environment for implementing embodiments of the present invention is shown and designated generally as computing device 1000. Computing device 1000 is but one example of a suitable computing environment and is not intended to suggest any limitation as to the scope of use or functionality of the invention. Neither should the computing device 1000 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 10, computing device 1000 includes a bus 1010 that directly or indirectly couples the following devices: memory 1012, one or more processors 1014, one or more presentation components 1016, input/output (I/O) ports 1018, input/output components 1020, and an illustrative power supply 1022. Bus 1010 represents what may be one or more busses (such as an address bus, data bus, or combination thereof). Although the various blocks of FIG. 10 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. This disclosure recognizes that such is the nature of the art, and it is reiterated that the diagram of FIG. 10 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 10 and reference to "computing device."

Computing device 1000 typically includes a variety of computer-readable media. Computer-readable media can be any available media that can be accessed by computing device 1000 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 1000. Computer storage media does not comprise signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 1012 includes computer-storage media in the form of volatile and/or nonvolatile memory. The memory may be removable, non-removable, or a combination thereof. Exemplary hardware devices include solid-state memory, hard drives, optical-disc drives, etc. Computing device 1000 includes one or more processors that read data from various entities such as memory 1012 or I/O components 1020. Presentation component(s) 1016 present data indications to a user or other device. Exemplary presentation components include a display device, speaker, printing component, vibrating component, etc.

I/O ports 1018 allow computing device 1000 to be logically coupled to other devices including I/O components 1020, some of which may be built in. Illustrative components include a microphone, joystick, game pad, satellite dish, scanner, printer, wireless device, etc. The I/O components 1020 may provide a natural user interface (NUI) that processes air gestures, voice, or other physiological inputs generated by a user. In some instance, inputs may be transmitted to an appropriate network element for further processing. A NUI may implement any combination of speech recognition, touch and stylus recognition, facial recognition, biometric recognition, gesture recognition both on screen and adjacent to the screen, air gestures, head and eye tracking, and touch recognition associated with displays on the computing device 1000. The computing device 1000 may be equipped with depth cameras, such as, stereoscopic camera systems, infrared camera systems, RGB camera systems, and combinations of these for gesture detection and recognition. Additionally, the computing device 1000 may be equipped with accelerometers or gyroscopes that enable detection of motion. The output of the accelerometers or gyroscopes may be provided to the display of the computing device 1000 to render immersive augmented reality or virtual reality.

As can be understood, embodiments of the present invention provide for, among other things, creating digital brush strokes using local, incremental optimization to reduce delay in visual feedback and to correct artifacts and distortions that arise in corner sections of the brush strokes. The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

What is claimed is:

1. One or more non-transitory computer-readable media having a plurality of executable instructions embodied thereon, which, when executed by one or more processors, cause the one or more processors to perform a method for continuous pattern matching to generate a digital brush stroke, the method comprising:

generating for display a first temporary segment from a first set of exemplar brush stroke segments selected based on a first set of samples from input stroke data; and generating for display a first permanent segment and a second temporary segment from a second set of exemplar brush stroke segments selected based on the first set of samples and a second set of samples from the input data,
wherein generating for display the first permanent segment and the second temporary segment comprises generating the first permanent segment from one or more exemplar brush stroke segments selected based on the first set of samples and the second set of samples,
wherein the first permanent segment replaces the first temporary segment when the first permanent segment and the second temporary segment are displayed.

2. The computer-readable media of claim 1, wherein the second set of samples is received after the first set of samples is received.

3. The computer-readable media of claim 1, wherein the method further comprises determining parameters of an input stroke by applying an input path line representing a center of the input stroke and a plurality of ribs transecting the input path line.

4. The computer-readable media of claim 3, wherein the method further comprises:
   prior to generating for display the first permanent segment and the second temporary segment, detecting intersecting ribs from at least a first rib intersecting with a second rib; and
   adjusting at least one of the intersecting ribs such that the intersecting ribs no longer intersect,
   wherein the first permanent segment is based at least on the input path line and the plurality of ribs after at least adjusting the at least one of the intersecting ribs.

5. The computer-readable media of claim 4, wherein the method further comprises:
   after adjusting at least one of the intersecting ribs, detecting corner distortion by determining a length of at least a portion of an intersecting rib is outside at least one threshold value; and
   inserting at least one corner structure within a corner region of the input stroke,
   wherein the permanent segment is further based on the at least one corner structure.

6. The computer-readable media of claim 1, wherein the method further comprises: generating a second permanent segment and a third temporary segment based on at least the second set of samples and a third set of samples from the input stroke data, wherein the second permanent segment replaces the second temporary segment.

7. The computer-readable media of claim 1, wherein generating for display the first temporary segment comprises determining the first set of exemplary brush stroke segments is a match for the first set of samples, and wherein generating for display the first permanent segment and the second temporary segment comprises determining the second set of exemplary brush stroke segments is a match for the first set of samples and the second set of samples.

8. One or more non-transitory computer-readable media having a plurality of executable instructions embodied thereon, which, when executed by one or more processors, cause the one or more processors to perform a method for generating a corner of a curved, digital brush stroke, the method comprising:
   continuously receiving data indicating an input stroke, the data including an input path line representing a center of the input stroke and a plurality of ribs transecting the input path line, each rib comprising an interior portion inside of a curve formed by the input path line and an exterior portion outside of the curve formed by the input path line;
   detecting intersecting ribs from at least a first rib intersecting with a second rib;
   adjusting at least one of the intersecting ribs such that the intersecting ribs no longer intersect, wherein adjusting at least one of the intersecting ribs comprises adjusting a position of the interior portion of at least one intersecting rib and not adjusting a position of the exterior portion of the at least one intersecting rib; and
   generating a curved, digital brush stroke based on the plurality of ribs and the input path line.

9. The one or more computer-readable media of claim 8, wherein the first rib is adjacent to and immediately precedes the second rib.

10. The one or more computer-readable media of claim 8, wherein adjusting at least one of the intersecting ribs such that the intersecting ribs no longer intersect comprises adjusting at least one of the intersecting ribs such that endpoints of the intersecting ribs meet at a first meeting point, wherein the endpoints are distal to the input path line.

11. The one or more computer-readable media of claim 10, wherein the method further comprises:
   detecting a third rib intersects with the second rib, the third rib being adjacent the second rib;
   adjusting at least one of the first rib, the second rib, and the third rib such that the endpoints of each of the first rib, the second rib, and the third rib intersect at a second meeting pointing point, wherein the second meeting point replaces the first meeting point.

12. The one or more computer-readable media of claim 8, wherein the curved brush stroke comprises a plurality of samples spaced along the input path line, and wherein generating the curved, digital brush stroke is further based on matching each sample within the plurality of samples to an exemplar brush stroke segment stored in an exemplar brush stroke segment library.

13. The one or more computer-readable media of claim 8, wherein, prior to adjusting at least one of the intersecting ribs such that the intersecting ribs no longer intersect, a temporary segment based on at least the intersecting ribs is generated, and wherein generating the curved, digital brush stroke comprises at least generating a permanent segment to replace the temporary segment.

14. A computer-implemented system comprising:
   one or more processors; and
   one or more computer storage media storing computer-usable instructions to cause the one or more processors to perform operations comprising:
   receiving data indicating an input stroke, the input stroke having parameters that include an input path line representing a center of the input stroke and a plurality of ribs transecting the input path line;
   detecting corner distortion by determining a length of at least a portion of a rib is outside at least one threshold value;
   inserting at least one corner structure within a corner region of the input stroke; and
   generating a curved brush stroke based on the plurality of ribs, the input path line, and the at least one corner structure.

15. The computer-implemented system of claim 14, wherein the method further comprises: prior to detecting corner distortion, adjusting two or more intersecting ribs from a non-collapsed form to a collapsed form in which the endpoints of each intersecting rib meet at a single meeting point.

16. The computer-implemented system of claim 15, wherein corner distortion is detected when the length of at least a portion of a rib in the collapsed form is less than half of a length in the non-collapsed form or is greater than or equal to one and half times the length in the non-collapsed form.

17. The system of claim 15, wherein inserting at least one corner structure comprises inserting at least a first corner structure comprising a plurality of first vertices and a second corner structure comprising a plurality of second vertices.

18. The system of claim 17, wherein the first corner structure extends from a breaking sample to at least a post-breaking sample and the second corner structure extends from the post-breaking sample to at least the breaking sample, wherein the breaking sample comprises a sample having a greatest angle between two adjacent ribs prior to inserting the first corner structure and the second corner structure and wherein the post-breaking sample is a sample immediately following the breaking sample.

19. The computer-implemented system of claim 18, wherein inserting the first corner structure and the second corner structure comprises:
   re-adjusting each intersecting rib into the non-collapsed form;
   inserting the plurality of first vertices in a first tangential direction determined from at least a sample in an exemplar brush stroke segment to which the breaking sample matches; and
   inserting the plurality of second vertices in a second tangential direction determined from at least a sample in an exemplar brush stroke segment to which the post-breaking sample matches.

20. The computer-implemented system of claim 18, wherein generating the curved brush stroke comprises:
   matching the first corner structure to first samples of an exemplar brush stroke segment, the first samples being in numerical order beginning with a sample immediately following a sample to which the breaking sample matches; and
   matching the second corner structure to second samples of an exemplar brush stroke segment, the second samples being in reverse numerical order beginning with a sample immediately before a sample to which the post-breaking sample matches.

* * * * *